(12) United States Patent
Yu et al.

(10) Patent No.: US 10,594,607 B2
(45) Date of Patent: Mar. 17, 2020

(54) SWITCHING APPARATUS, SWITCHING APPARATUS GROUP, DATA TRANSMISSION METHOD, AND COMPUTER SYSTEM

(71) Applicant: HUAWEI TECHNOLOGIES CO., LTD., Shenzhen, Guangdong (CN)

(72) Inventors: Donghao Yu, Xi'an (CN); Chenghong He, Shenzhen (CN); Ting Yang, Xi'an (CN)

(73) Assignee: HUAWEI TECHNOLOGIES CO., LTD., Shenzhen (CN)

(*) Notice: Subject to any disclaimer, the term of this patent is extended or adjusted under 35 U.S.C. 154(b) by 115 days.

(21) Appl. No.: 15/696,900

(22) Filed: Sep. 6, 2017

(65) Prior Publication Data
US 2018/0069794 A1 Mar. 8, 2018

(30) Foreign Application Priority Data

Sep. 6, 2016 (CN) .......................... 2016 1 0804012

(51) Int. Cl.
*H04L 12/801* (2013.01)
*H04L 12/931* (2013.01)
(Continued)

(52) U.S. Cl.
CPC .............. *H04L 47/12* (2013.01); *H04L 47/11* (2013.01); *H04L 49/00* (2013.01); *H04L 49/10* (2013.01); *H04L 49/15* (2013.01); *H04L 49/254* (2013.01)

(58) Field of Classification Search
None
See application file for complete search history.

(56) References Cited

U.S. PATENT DOCUMENTS

| 2004/0019726 A1* | 1/2004 | Kelley ................ G06F 13/4045 710/305 |
| 2006/0004837 A1 | 1/2006 | Genovker et al. |

(Continued)

FOREIGN PATENT DOCUMENTS

| CN | 1744546 A | 3/2006 |
| CN | 101001209 A | 7/2007 |
| CN | 103259830 A | 8/2013 |

OTHER PUBLICATIONS

Extended European Search Report, dated Nov. 16, 2017, in European Application No. 17189523.8 (12 pp.).

*Primary Examiner* — Faruk Hamza
*Assistant Examiner* — Alan L Lindenbaum
(74) *Attorney, Agent, or Firm* — Maier & Maier, PLLC (57) ABSTRACT

The present invention discloses a switching apparatus, a switching apparatus group, a data transmission method, and a computer system, and pertains to the field of computer technologies. The switching apparatus includes: a selection circuit module, a SERDES module, and a scheduling module. The selection circuit module establishes at least (n−1) static links with each of n modes, and any two static links that are connected to the selection circuit module and that belong to different nodes are connected to each other. The SERDES module is disposed on a static link connected to the selection circuit module. The scheduling module establishes connections to the selection circuit module and each of the n nodes. The selection circuit module further establishes at least one dynamic link with each of the n nodes.

12 Claims, 7 Drawing Sheets

(51) Int. Cl.
*H04L 12/933* (2013.01)
*H04L 12/937* (2013.01)

(56) References Cited

U.S. PATENT DOCUMENTS

2007/0147386 A1    6/2007  Choi et al.
2015/0036694 A1*  2/2015  Binetti ................ H04L 41/0896
                                                         370/468

* cited by examiner

SWITCHING APPARATUS, SWITCHING APPARATUS GROUP, DATA TRANSMISSION METHOD, AND COMPUTER SYSTEM

CROSS-REFERENCE TO RELATED APPLICATION

This application claims priority to Chinese Patent Application No. 201610804012.9, filed on Sep. 6, 2016, which is hereby incorporated by reference in its entirety.

TECHNICAL FIELD

The present invention relates to the field of computer technologies, and in particular, to a switching apparatus, a switching apparatus group, a data transmission method, and a computer system.

BACKGROUND

A computer system may include multiple nodes. Each node may include a processor, a memory, and the like. During data transmission between multiple nodes, a processor in a node may send data in a memory in the node to another node. Currently, data is usually transmitted between nodes by using a serializer/deserializer (SERDES for short) technology. That is, after converting parallel physical code into serial physical code by using a SERDES module, a node sends the serial physical code to another node. The another node converts the serial physical code into parallel physical code by using a SERDES module. In this way, data can be serially transmitted between nodes, so that a transmission rate is relatively high.

There is a data transmission method in a related technology. In the method, multiple nodes are connected to one switching apparatus, and the switching apparatus schedules data in the multiple nodes. The switching apparatus includes a SERDES module, a physical layer (English; Physical Layer, PHY for short) module, a link (English: link) layer module, and a routing module. After entering the switching apparatus, serial physical code sent by a node is first converted into parallel physical code by using the SERDES module, and then is converted, by successively using the PHY module and the link layer module, into a packet (the packet includes routing information such as a destination node) that can be routed. The packet obtained after conversion enters the routing module, and the routing module determines a path. Then the packet is converted into parallel physical code by successively using the link layer module and the PHY module. Then the parallel physical code is convened into serial physical code by using the SERDES module, and the serial physical code is transmitted to a destination node according to the path determined by the routing module.

The prior art has at least the following problems: To enable data to be routed in the method, the switching apparatus converts serial physical code received from a node into a packet. After obtaining routing information from the packet, the switching apparatus restores the packet to the serial physical code, and sends the serial physical code to a destination node. Because the data undergoes multiple times of conversion in the switching apparatus, a data transmission delay is relatively large, and work efficiency of the computer system is affected.

SUMMARY

To resolve a prior-art problem that a data transmission delay is relatively large and work efficiency of a computer system is affected because data undergoes multiple times of conversion in a switching apparatus, embodiments of the present invention provide a switching apparatus, a switching apparatus group, a data transmission method, and a computer system. The technical solutions are as follows:

According to a first aspect of the present invention, a switching apparatus is provided, and is configured to schedule data in n nodes, where n is an integer greater than 1, and the switching apparatus includes:

a selection circuit module, a SERDES module, and a scheduling module. The selection circuit module may include selection circuits of multiple in and multiple out, the selection circuit module establishes at least (n−1) static links with each of the n nodes, and any two static links that are connected to the selection circuit module and that belong to different nodes are connected to each other in the selection circuit module. That is, at least one static link is connected between any node and each of the n nodes except the node. The static link may be used for data transmission between any two of the n nodes. For example, in the n nodes, a node A (the node A is any one of the n nodes) may establish at least one static transmission path with each remaining node. Each static transmission path may include a static link between the node A and the selection circuit module, a connection in the selection circuit module, and a static link between another node and the selection circuit module. The static link may be a link with a fixed connection relationship in the selection circuit module. That is, the static link is fixedly connected, in the selection circuit module, to another static link connected to the selection circuit module.

The SERDES module is disposed on a static link connected to the selection circuit module, and is configured to: convert serial physical code that needs to enter the selection circuit module by using the static link into parallel physical code, and convert parallel physical code that is sent from the selection circuit module and that enters the static link into serial physical code. That is, the SERDES module may convert serial physical code sent by each node to the selection circuit module in the switching apparatus into parallel physical code that can be transmitted in a selection circuit (because the serial physical code has a relatively high frequency, and it is difficult to perform timing closure in the selection circuit module, the serial physical code needs to be converted into the parallel physical code, and then the parallel physical code is input to the selection circuit module). The SERDES module may further convert parallel physical code sent from the selection circuit module to each node into serial physical code. In this way, it can be ensured that data transmitted between the switching apparatus and a node is always serial physical code, so that transmission efficiency is improved. The switching apparatus connects multiple nodes together by using the selection circuit, so that routing is not required in data transmission. Therefore, data does not need to be converted into a packet that includes routing information, so that a quantity of data conversion times in a transmission process is reduced, a data transmission delay is shortened, and the work efficiency of the computer system is improved.

The scheduling module establishes a connection to the selection circuit module and each of the n nodes. The selection circuit module further establishes at least one dynamic link with each of the n nodes. A specific quantity of dynamic links may be determined alter comprehensively considering a bandwidth required by each node and costs. A connection established between the scheduling module and the node may be a control link. The control link may be a link configured to transmit congestion information sent by the node to the scheduling module and information sent by the scheduling module to the node. The dynamic link may be a link with an unfixed connection relationship in the selection circuit module. A connection relationship between a dynamic link and another dynamic link in the selection circuit module may be controlled by the scheduling module.

The scheduling module is configured to obtain congestion information of a congested node in the n nodes. The congestion information may include indication information of a destination node that a congested packet needs to reach. The scheduling module may control, according to congestion information obtained from each node, the selection circuit module to connect at least one dynamic link of the congested node to at least one dynamic link of the destination node. Therefore, a bandwidth between the congested node and the destination node increases, and the congested packet can be transmitted by using the added dynamic links, so that a problem of congestion between nodes is resolved. In addition, the congestion information may further include a quantity of congested packets in the congested node. For example, the congested node is the node A, there are 10 congested packets, and a destination node that the 10 packets need to reach is a node B (the 10 packets may further have different destination nodes). In this case, the node A may send, to the scheduling module, congestion information that includes a quantity of the congested packets and indication information of the destination node that the congested packets need to reach. The scheduling module may control, according to the congestion information, the selection circuit module to connect m dynamic links of the node A to m dynamic links of the node B. There may be a positive correlation between the quantity m of dynamic links and the quantity of the congested packets.

In an optional implementation, the SERDES module is further disposed on a dynamic link between the selection circuit module and a node, and is configured to: convert serial physical code that needs to enter the selection circuit module into parallel physical code, and convert parallel physical code sent from the selection circuit module into serial physical code. A function obtained by disposing the SERDES module on a dynamic link between the selection circuit module and a node is similar to that obtained when the SERDES module is disposed on a static link. Details are not described herein.

In an optional implementation, the scheduling module is further configured to: when congestion in the congested node is cleared, control the selection circuit module to disconnect a connection between the dynamic link of the congested node and the dynamic link of the destination node. In this way, a dynamic link can be released in time, so that the scheduling module can re-allocate a dynamic link connection relationship. For example, the selection circuit module first connects the m dynamic links of the node A to the m dynamic links of the node B. After the node A transmits, to the node B, all congested packets whose destination nodes are the node B, the scheduling module may control the selection circuit module to disconnect m dynamic links between the node A and the node B. In this way, the node A has m idle dynamic links. When the node A is congested, and a destination node of a congested packet is a node C, the scheduling module may control the selection circuit module to connect the m dynamic links of the node A to m dynamic links of the node C, so that dynamic link utilization is improved.

In an optional implementation, the switching apparatus further includes a conversion module. The conversion module is disposed on a connection (the connection may be a control link) between the scheduling module and a node, and is configured to: convert parallel physical code that needs to enter the scheduling module into a packet, and convert a packet sent from the scheduling module into parallel physical code. The conversion module may include a physical layer unit and a link layer unit. The scheduling module needs to analyze content of congestion information obtained from the node. Therefore, the conversion module that includes the physical layer unit and the link layer unit may be disposed on the connection between the scheduling module and the node. Parallel physical code sent by the node may successively pass through the physical layer unit and the link layer unit, and is converted into a packet. The scheduling module may obtain congestion information from the packet.

In an optional implementation, the SERDES module is further disposed on a connection (the connection may be a control link) between the conversion module and a node, and is configured to: convert serial physical code that needs to enter the scheduling module into parallel physical code, and convert parallel physical code sent from the scheduling module into serial physical code. In this way, the node may transmit congestion information to the scheduling module in a form of serial physical code, so that demands for bandwidth are reduced, and a transmission rate is increased.

According to a second aspect of the present invention, a switching apparatus group is provided. The switching apparatus group includes at least two switching apparatuses connected to each other. At least one switching apparatus is any switching apparatus according to the first aspect of the present invention. That is, the switching apparatus group may include the switching apparatus according to the first aspect, and may further include a switching apparatus in a related technology. For a connection manner between multiple switching apparatuses, refer to a switching chip group in a related technology. For example, when a switching apparatus is connected to another switching apparatus, the another switching apparatus may be considered as a node.

According to a third aspect of the present invention, a data transmission method is provided and is applied to the switching apparatus according to the first aspect, where the method includes:

When a node needs to send data to another node, the node may convert the data into serial physical code, and transmit the data to the switching apparatus by using a first static link. After the serial physical code enters the switching apparatus, a SERDES module located on the first static link in the switching apparatus converts the serial physical code into parallel physical code, and transmits the parallel physical code to a selection circuit module. The first static link is connected to a second static link in the selection circuit module, and the second static link is a static link connected between the another node and the selection circuit module.

After the parallel physical code enters the selection circuit module, the switching apparatus may transmit the parallel physical code to the second static link connected to the first static link. After the parallel physical code is converted into serial physical code by using a SERDES module on the second static link, the serial physical code is transmitted to the another node connected to the second static link.

The switching apparatus directly connects multiple nodes together by using a selection circuit. When data is sent from a node to another node by using the switching apparatus, routing is not required in data transmission. Therefore, the data does not need to be converted into a packet that includes routing information, so that a quantity of data conversion times in a transmission process is reduced, a data transmission delay is shortened, and work efficiency of a computer system is improved.

When a node is congested (when multiple packets that are not sent in time accumulate in a node, it may be considered that the node is congested), the node may send congestion information to a scheduling module in the switching apparatus. When the scheduling module receives the congestion information sent by the congested node, the switching apparatus may control, according to the congestion information, the selection circuit module to connect at least one dynamic link of the congested node to at least one dynamic link of a destination node, so as to form at least one dynamic path (the dynamic path may include the dynamic link of the congested node, the dynamic link of the destination node, and a dynamic connection that connects the two dynamic links). A bandwidth between the congested node and the destination node increases. The congestion information may include indication information of the destination node, and the destination node is a node that a congested packet needs to reach. In addition, the congestion information may further include a quantity of congested packets in the congested node. There may be a positive correlation between a quantity of dynamic paths and the quantity of congested packets. That is, more congested packets indicate more dynamic paths that the scheduling module may control the selection circuit module to establish.

After the dynamic path is established, the switching apparatus may transmit a congested packet to the destination node by using the at least one dynamic link of the congested node, at least one dynamic path, and the at least one dynamic link of the destination node. A process of transmitting the congested packet is similar to a process of transmitting a packet by using a static link. Details are not described herein.

The bandwidth between the congested node and the destination node is increased by using a dynamic link. Therefore, the congested packets can be transmitted very soon.

In an optional implementation, after the congested packet is transmitted to the destination node by using the at least one dynamic link of the congested node, the at least one dynamic connection, and the at least one dynamic link of the destination node, the method further includes:

disconnecting the at least one dynamic connection.

After the congested packet is transmitted to the destination node, it may be considered that congestion in the congested node is cleared. In this case, the selection circuit module may be controlled to disconnect a connection between the dynamic link of the congested node and the dynamic link of the destination node. In this way, a dynamic link can be released in time, so that the scheduling module can re-allocate a dynamic link connection relationship.

In an optional implementation, before the congested packet is received by using the at least one dynamic link of the congested node, the method further includes:

sending indication information of the at least one dynamic connection to the congested node and the destination node by using the scheduling module, where the indication information of the at least one dynamic connection is used to instruct the congested node and the destination node to transmit the congested packet by using the at least one dynamic connection. That is, the scheduling module may notify the congested node and the destination node in advance that the congested packet may be transmitted by using the established dynamic connection. In this way, the congested node and the destination node can transmit the congested packet by using the dynamic connection.

According to a fourth aspect of the present invention, a computer system is provided. The computer system includes a switching apparatus and n nodes. The switching apparatus is the switching apparatus according to the first aspect, and is configured to schedule data in the n nodes.

In an optional implementation, the n nodes include at least one switching apparatus according to the first aspect. That is, the computer system may include multiple switching apparatuses. The multiple switching apparatuses may form a switching apparatus group, so as to increase a quantity of nodes that can be scheduled by the computer system.

In an optional implementation, the n nodes include at least one node controller, the node controller is configured to establish a connection between the n nodes and other nodes, and the other nodes are nodes other than the n nodes. Due to a hardware limitation, quantities of static links and dynamic links that can be connected to each node are limited to an extent. Therefore, the node may be connected to a node controller (English: Node Controller), and then the node controller is connected to the switching apparatus, so as to increase a quantity of nodes that can be scheduled by a switching apparatus. For connection between the node controller and the node, refer to a related technology. Details are not described herein.

The technical solutions provided in the embodiments of the present invention bring the following beneficial effects:

The switching apparatus connects multiple nodes together by using the selection circuit module, so that routing is not required in data transmission. In addition, when a node is congested, a bandwidth between the congested node and a destination node is increased by using the selection circuit module, so that a related-technology problem that a data transmission delay is relatively large and work efficiency of a computer system is affected because data undergoes multiple times of conversion in the switching apparatus is resolved, and the data does not need to be converted into a packet that includes routing information. Therefore, a quantity of data conversion times in a transmission process is reduced, a data transmission delay is shortened, and the work efficiency of the computer system is improved.

BRIEF DESCRIPTION OF DRAWINGS

To describe the technical solutions in the embodiments of the present invention more clearly, the following briefly describes the accompanying drawings required for describing the embodiments. Apparently, the accompanying drawings in the following description show merely some embodiments of the present invention, and a person of ordinary skill in the art may still derive other drawings from these accompanying drawings without creative efforts.

According to the accompanying drawings above, specific embodiments of the present invention are shown, and details are described below. These accompanying drawings and word descriptions are not intended to limit a scope of the invention conception in any manner, but to describe, with reference to specific embodiments, a concept of the present invention for a person of ordinary skill in the art.

DESCRIPTION OF EMBODIMENTS

To make the objectives, technical solutions, and advantages of the present invention clearer, the following further describes the embodiments of the present invention in detail with reference to the accompanying drawings.

A switching apparatus provided in the embodiments of the present invention may be applied to a scale-up (English: Scale-up) structure computer system in which multiple processors are connected to each other. Processors of nodes in the computer system need to share memories of each other. Therefore, a communication link between the processors of the nodes is required for data transmission and data consistency maintenance, and the communication link has a relatively high requirement for a delay.

Figure 1:
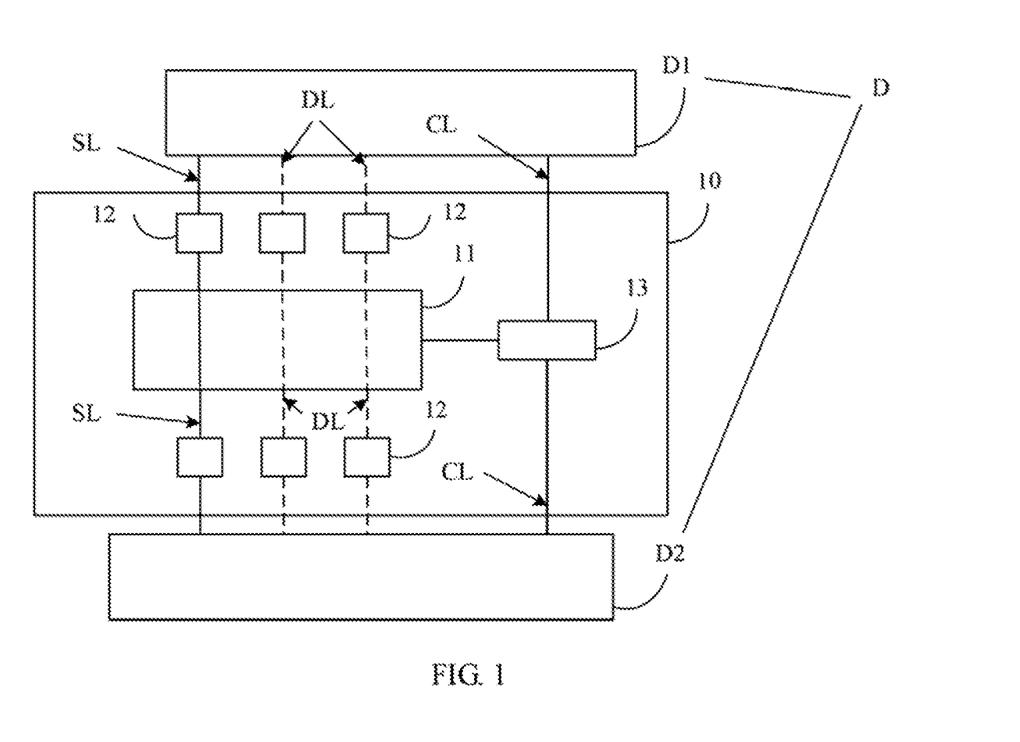
FIG. 1 is a schematic structural diagram of a switching apparatus according to an embodiment of the present invention.

FIG. 1 is a schematic structural diagram of a switching apparatus according to an embodiment of the present invention. The switching apparatus is configured to schedule data in n nodes D, where n is an integer greater than 1. The switching apparatus 10 may include:

a selection circuit module 11, a SERDES module 12, and a scheduling module 13. The selection circuit module 11 may include selection circuits of multiple in and multiple out, the selection circuit module 11 establishes at least (n−1) static links SLs with each of the n nodes D, and any two static links SLs that are connected to the selection circuit module 11 and that belong to different nodes D are connected to each other in the selection circuit module 11. That is, at least one static link is connected between any node of the n nodes and other (n−1) nodes. The static link may be used for data transmission between any two of the n nodes. For example, in the n nodes, a node A may establish at least one static transmission path with each remaining node. Each static transmission path may include a static link between the node A and the selection circuit module, a connection in the selection circuit module, and a static link between another node and the selection circuit module. The static link may be a link with a fixed connection relationship in the selection circuit module 11. That is, the static link is fixedly connected, in the selection circuit module 11, to another static link connected to the selection circuit module 11.

The SERDES module 12 is disposed on a static link SL connected to the selection circuit module 11, and is configured to: convert serial physical code that needs to enter the selection circuit module 11 by using the static link SL into parallel physical code (because the serial physical code has a relatively high frequency, and it is difficult to perform timing closure in the selection circuit module, the serial physical code needs to be converted into the parallel physical code, and then the parallel physical code is input to the selection circuit module); and convert parallel physical code that is sent from the selection circuit module 11 and that enters the static link SL into serial physical code. That is, the SERDES module 12 may convert serial physical code sent by each node D to the selection circuit module 11 in the switching apparatus 10 into parallel physical code that can be transmitted in a selection circuit. The SERDES module 12 may further convert parallel physical code sent from the selection circuit module 11 to each node D into serial physical code. In this way, it can be ensured that data transmitted between the switching apparatus 10 and a node D is always serial physical code, so that transmission efficiency can be improved. The SERDES module 12 may be a whole module, or may be multiple modules disposed on each static link. FIG. 1 shows a scenario in which the SERDES module 12 is multiple modules.

FIG. 1 shows a scenario in which n is 2, n may also be another value, and this is not limited in this embodiment of the present invention. In addition, a node in FIG. 1 is shown for description, and may not be included in the switching apparatus provided in this embodiment of the present invention.

When there is a relatively small quantity of static links connected between a node and another node, congestion easily occurs. Due to a hardware limitation, a quantity of links that can be connected to a node is limited. Therefore, it is not likely that there is a large quantity of static links connected between a node and another node. The switching apparatus provided in the present invention resolves the problem by using a scheduling module to connect to a dynamic link.

In FIG. 1, each of the n nodes D establishes a connection CL with the scheduling module 13. The connection CL may be a control link configured to send information to each node and receive congestion information sent by each node. The scheduling module 13 establishes a connection to the selection circuit module 11. The connection is used to send control information to the selection circuit module 11. The selection circuit module 11 further establishes at least one dynamic link DL with each of the n nodes. A specific quantity of dynamic links DLs may be determined after comprehensively considering a bandwidth required by each node and costs. In FIG. 1, a quantity n of nodes is two, one static link SL is established between a node D1 and a node D2, and two dynamic links DLs are established between the selection circuit module 11 and each of the node D1 and the node D2. Any one of the n nodes may include a processor and a memory that are connected. The processor is connected to the switching apparatus, and the memory is configured to store data. The processor is configured to send data in the memory to the switching apparatus, or store, in the memory, data received from the switching apparatus.

The scheduling module 13 is configured to obtain congestion information of a congested node in the n nodes D. The congestion information may include indication information of a destination node that a congested packet needs to reach. The scheduling module 13 may control, according to congestion information obtained from each node, the selection circuit module 11 to connect at least one dynamic link of the congested node (when multiple packets that are not sent in time accumulate in a node, it may be considered that the node is congested) to at least one dynamic link of the destination node. Therefore, a bandwidth between the congested node and the destination node increases, and the congested packet can be transmitted by using the added dynamic links, so that a problem of congestion between nodes is resolved. In addition, the congestion information may further include a quantity of congested packets in the congested node. For example, the congested node is the node D1, there are 10 congested packets, and a destination node that all the 10 packets need to reach is the node D2 (the 10 packets may also have different destination nodes). In this case, the node D1 may send, to the scheduling module 13, congestion information that includes a quantity of the congested packets and indication information of the destination node that the congested packets need to reach. The scheduling module 13 may control, according to the congestion information, the selection circuit module 11 to connect m dynamic links of the node D1 to m dynamic links of the node D2. There may be a positive correlation between the quantity m and the quantity of the congested packets.

The static link and the dynamic link in this embodiment of the present invention may include a clock link and a data link. For details, refer to a data link in a related technology, and details are not described herein.

In an optional implementation, the SERDES module 12 is further disposed on a dynamic link DL between the selection circuit module 11 and a node D, and is configured to: convert serial physical code that needs to enter the selection circuit module 11 into parallel physical code, and convert parallel physical code sent from the selection circuit module 11 into serial physical code. A function obtained by disposing the SERDES module 12 on a dynamic link between the selection circuit module and a node is similar to that obtained when the SERDES module 12 is disposed on a static link, and the function is to enable data to be transmitted between the node and the switching apparatus in a form of serial physical code, so as to increase a data transmission rate.

In an optional implementation, the scheduling module 13 is further configured to: when congestion in the congested node is cleared, control the selection circuit module 11 to disconnect a connection between the dynamic link of the congested node and the dynamic link of the destination node. In this way, a dynamic link can be released in time, so that the scheduling module can re-allocate a dynamic link connection relationship.

Figure 2:
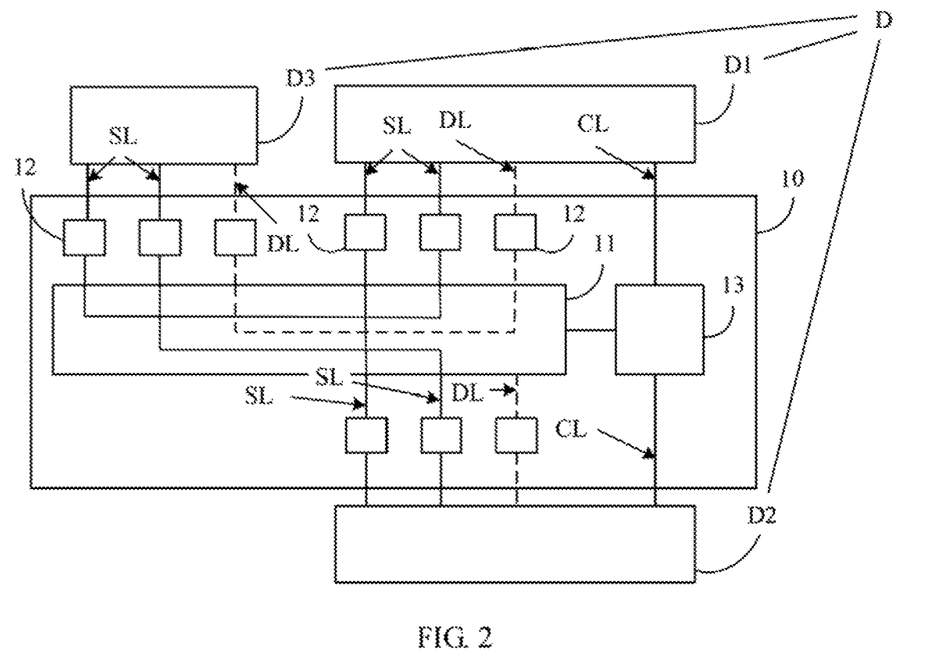
FIG. 2 is a schematic diagram of dynamic link reconnection in a switching apparatus shown in FIG. 1.

For example, the m dynamic links DLs of the node D1 are connected to the m dynamic links DLs of the node D2. After the node D1 transmits, to the node D2, all congested packets whose destination nodes are the node D2, the scheduling module 13 may control the selection circuit module 11 to disconnect a connection between the dynamic links of the node D1 and the dynamic links of the node D2. In this way, the node D has idle dynamic links. As shown in FIG. 2, when the node D1 is congested, and a destination node of a congested packet is a node D3, the scheduling module 13 may control the selection circuit module 11 to connect an idle dynamic link DL of the node DL to a dynamic link DL of the node D3. By disconnecting a connection between dynamic links in time, dynamic link utilization can be improved, and a congestion processing capability of the switching apparatus is improved. For meanings of other marks in FIG. 2, refer to FIG. 1, and details are not described herein again.

Figure 3:
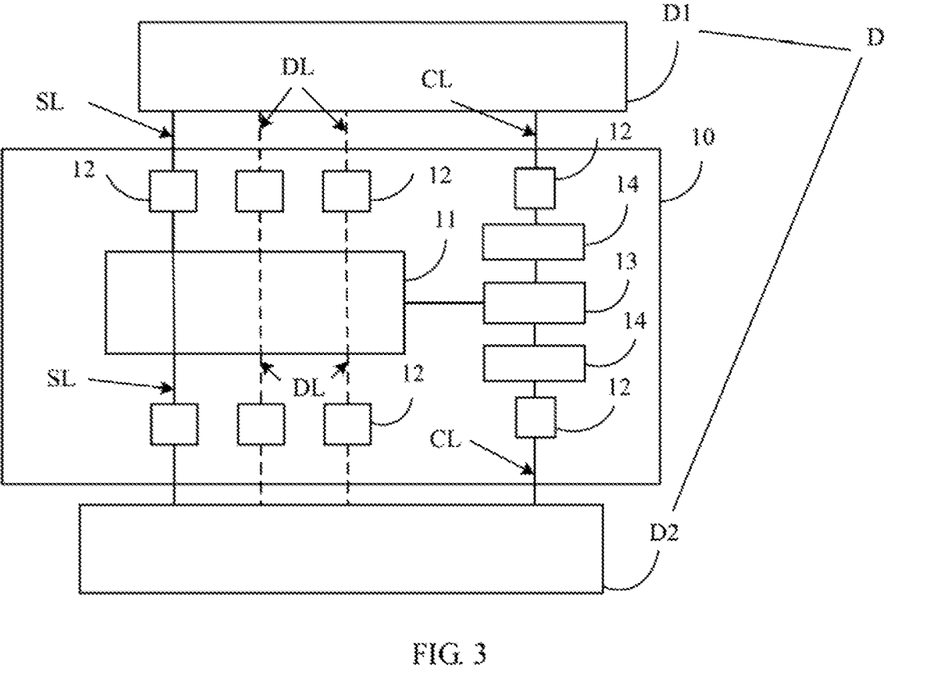
FIG. 3 is a schematic structural diagram of another switching apparatus according to an embodiment of the present invention.

As shown in FIG. 3, FIG. 3 is a schematic structural diagram of another switching apparatus 10 according to this embodiment of the present invention. The switching apparatus 10 further includes a conversion module 14. The conversion module 14 is disposed on a control link CL between the scheduling module 13 and the node D, and is configured to: convert parallel physical code that needs to enter the scheduling module 13 into a packet, and convert a packet sent from the scheduling module 13 into parallel physical code. The conversion module 14 may include a physical layer unit and a link layer unit (not shown in FIG. 3). The scheduling module 13 needs to analyze content of congestion information obtained from the node D. Therefore, the conversion module 14 that includes the physical layer unit and the link layer unit may be disposed on the control link between the scheduling module 13 and the node.

Parallel physical code sent by the node may successively pass through the physical layer unit and the link layer unit, and is converted into a packet. The scheduling module 13 may obtain the congestion information from the packet. For meanings of other marks in FIG. 3, refer to FIG. 1, and details are not described herein again.

In an optional implementation, the SERDES module 12 is further disposed on a control link CL between the conversion module 14 and the node D, and is configured to: convert serial physical code that needs to enter the scheduling module 13 into parallel physical code, and convert parallel physical code sent from the scheduling module 13 into serial physical code. In this way, the node D may transmit congestion information to the scheduling module 13 in a form of serial physical code, so that demands for bandwidth are reduced, and a transmission rate is increased.

Figure 4:
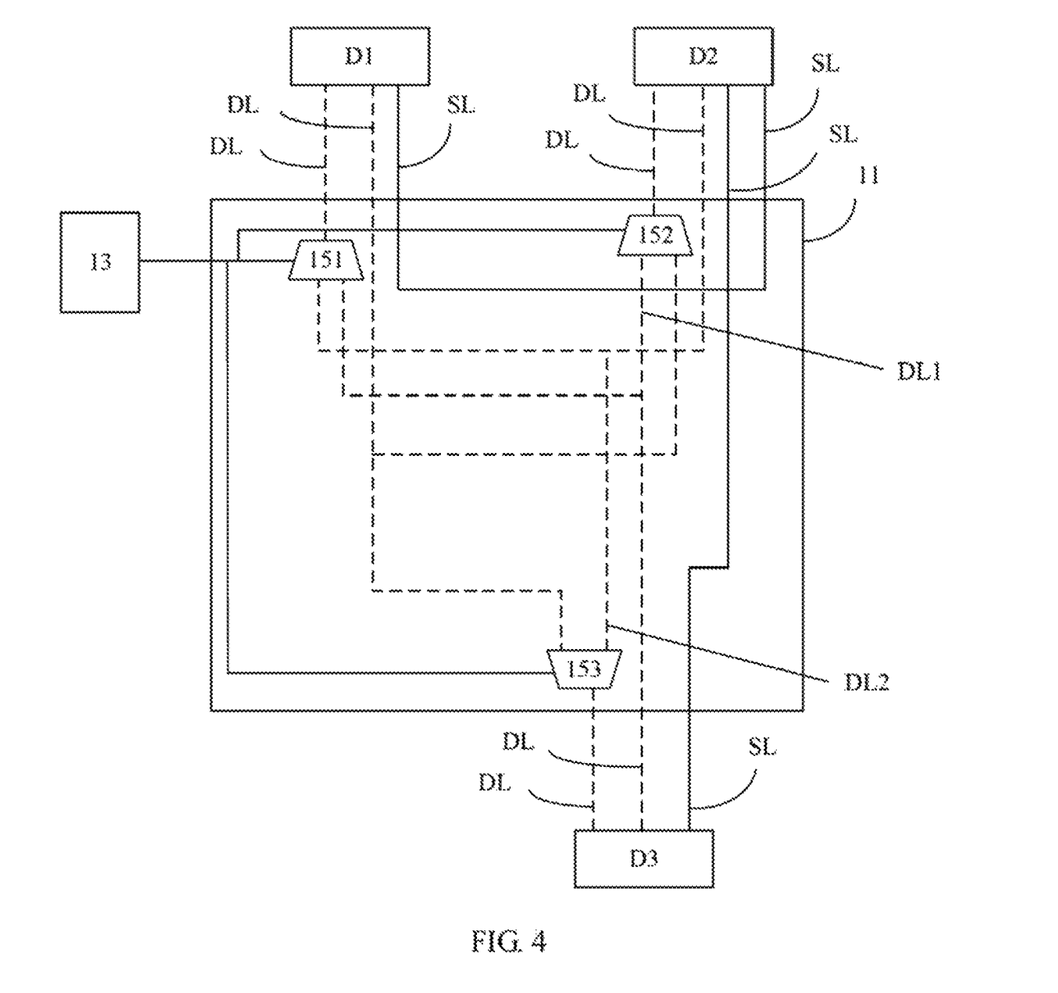
FIG. 4 is a schematic structural diagram of a selection circuit module according to an embodiment of the present invention.

FIG. 4 is a schematic structural diagram of a selection circuit module 11 according to an embodiment of the present invention. The selection circuit module 11 includes multiple multiplexers (FIG. 4 shows a scenario in which the selection circuit module includes three multiplexers: a multiplexer 151, a multiplexer 152, and a multiplexer 153). The multiplexer is another name of a data selector. In a process of transmitting multiple pieces of data, a circuit that can select any piece of data according to a requirement is referred to as a data selector, or referred to as a multiplexer or a multiplexer switch. Each multiplexer is connected to the scheduling module 13, and the scheduling module 13 may control selection of the multiplexer. In FIG. 4, one end of each multiplexer is connected to a dynamic link, and the other end is connected to two dynamic connections inside the selection circuit module. The multiplexer may select, under control of the scheduling module, one dynamic connection to connect to the dynamic link connected to the multiplexer.

In the selection circuit module 11, a static link SL of a node D2 is connected to a static link SL of a node D3. In the selection circuit module 11, another static link SL of the node D2 is connected to a static link SL of a node D1. The nodes D1, D2, and D3 each establish two dynamic links DLs with the selection circuit module 11. One static link DL of the node D2 is connected to the multiplexer 151 and the multiplexer 153, and the other dynamic link DL is connected to the multiplexer 152. To connect the dynamic links of the node D2 to dynamic links of the node D3, the scheduling module 11 may control the multiplexer 153 to select a dynamic connection DL2 to connect to a static link DL of the node D3, so as to form a dynamic path (the dynamic path includes the dynamic connection DL2 and two dynamic links connected to the dynamic connection DL2), and control the multiplexer 152 to select a dynamic link DL1 to connect to a static link DL of the node D2, so as to form another dynamic path (the dynamic path includes the dynamic connection DL1 and two dynamic links connected to the dynamic connection DL1). In this way, there may be two dynamic paths between the node D2 and the node D3 for data transmission.

It should be noted that, to facilitate illustration and observation, a static link connected between the node DL and the node D3 is not shown in FIG. 4. In addition, in FIG. 4, one dynamic link of each node is connected to one multiplexer in the selection circuit module, and the other dynamic link is connected to two multiplexers in the selection circuit module. However, this is merely a possible implementation, a dynamic link of each node may be connected to one or more multiplexers, and this is not limited in this embodiment of the present invention.

Nodes in FIG. 1, FIG. 2, FIG. 3, and FIG. 4 are all shown for description, and may not be included in the switching apparatus provided in the present invention.

In conclusion, according to the switching apparatus provided in this embodiment of the present invention, multiple nodes are connected together by using the selection circuit module, so that routing is not required in data transmission. In addition, when a node is congested, a bandwidth between the congested node and a destination node is increased by using the selection circuit module, so that a related-technology problem that a data transmission delay is relatively large and work efficiency of a computer system is affected because data undergoes multiple times of conversion in the switching apparatus is resolved, and the data does not need to be converted into a packet that includes routing information. Therefore, a quantity of data conversion times in a transmission process is reduced, a data transmission delay is shortened, and the work efficiency of the computer system is improved.

Figure 5A:
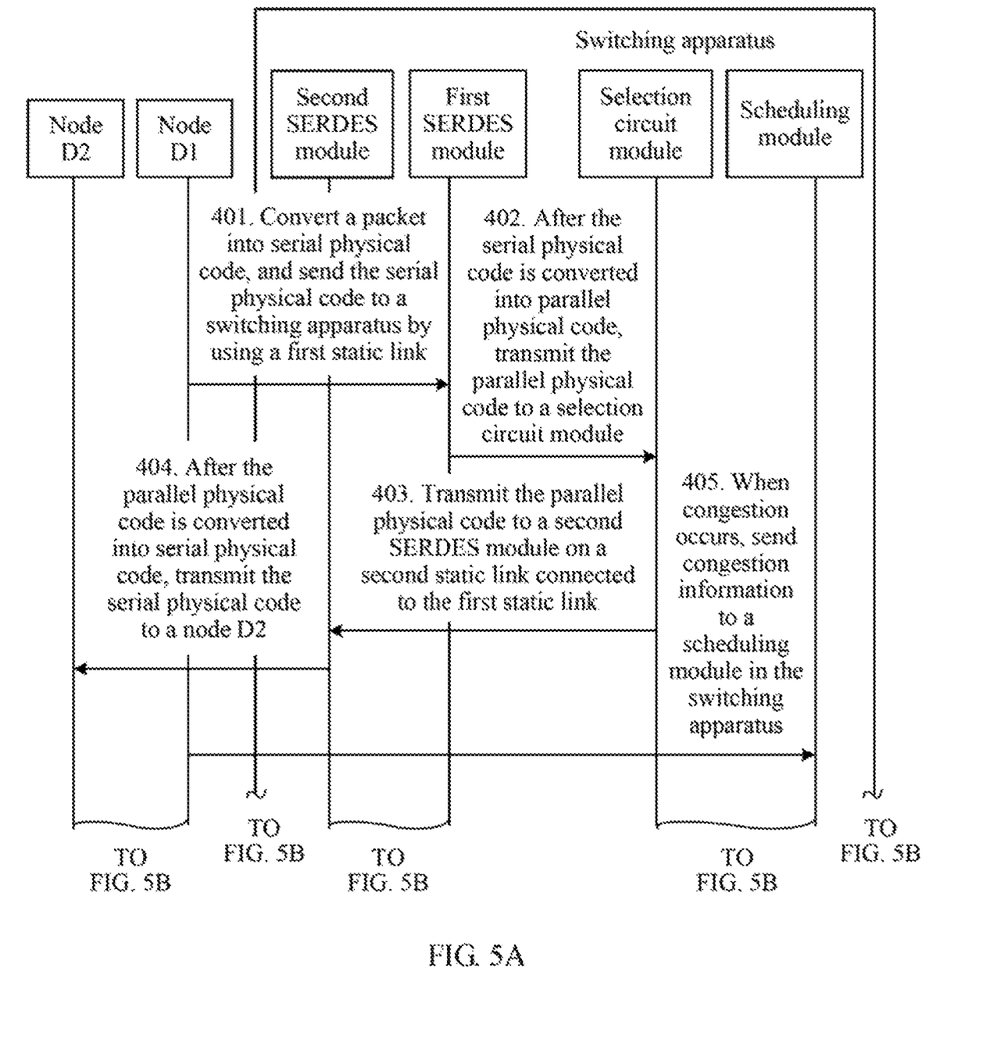
FIGS. 5A and 5B show a flowchart of another data transmission method according to an embodiment of the present invention.
Figure 5B:
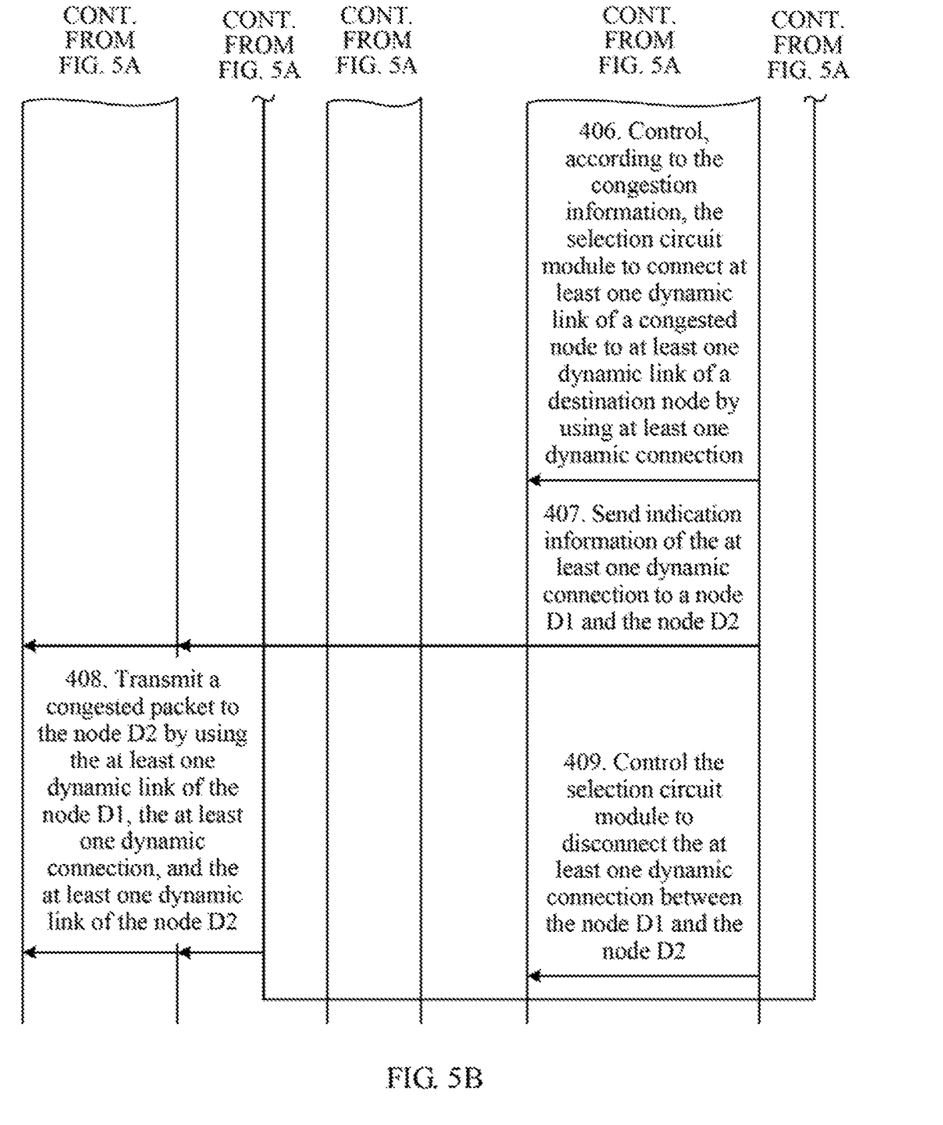

FIGS. 5A and 5B show a flowchart of a data transmission method according to an embodiment of the present invention. The method may be applied to the switching apparatus shown in FIG. 1, the switching apparatus shown in FIG. 2, or the switching apparatus shown in FIG. 3. The method includes the following steps.

Step 401: When a node D1 needs to transmit multiple packets to a node D2, the node D1 converts the packets into serial physical code, and sends the serial physical code to a switching apparatus by using a first static link.

The node D1 and the node D2 are two nodes in n nodes scheduled by the switching apparatus. When the node D1 needs to transmit the multiple packets to the node D2, the node D1 may convert the packets into the serial physical code, and then sends the serial physical code to the switching apparatus by using the first static link. The first static link is connected to a second static link in the switching apparatus, and the second static link is connected to the node D2.

It should be noted that the first static link may include multiple static links. The multiple static links may be static links connected to multiple static links of the second node D2 in the switching apparatus.

Step 402: After converting the serial physical code into parallel physical code, a first SERDES module in the switching apparatus transmits the parallel physical code to a selection circuit module.

After the serial physical code enters the switching apparatus, the first SERDES module on the first static link first converts the serial physical code into the parallel physical code, and then transmits the parallel physical code to the selection circuit module.

Step 403: The selection circuit module transmits the parallel physical code to a second SERDES module on a second static link connected to the first static link.

After obtaining the parallel physical code by using the first static link, the selection circuit module transmits the parallel physical code to the second static link connected to the first static link inside the selection circuit module. The parallel physical code enters the second SERDES module on the second static link.

Step 404: After converting the parallel physical code into serial physical code, the second SERDES module transmits the serial physical code to the node D2.

After the parallel physical code enters the second SERDES module, the second SERDES module converts the parallel physical code into the serial physical code, and transmits the serial physical code to the node D2.

Step 405: When the node D1 is congested, the node D1 sends congestion information to a scheduling module in the switching apparatus.

When the node D1 needs to send a relatively large quantity of packets to the node D2, and it is difficult to complete transmission in time by using the first static link (that is, congestion occurs), the node D1 may send the congestion information to the scheduling module in the switching apparatus. The congestion information may include indication information of a destination node that a congested packet needs to reach. In this embodiment of the present invention, the node D2 is used as the destination node for description. However, the destination node may also be another node, and this is not limited in this embodiment of the present invention. In addition, the congestion information may further include a quantity of congested packets and a node waiting time (the node waiting time may be considered as a time for which a processor in a node waits, due to congestion, for a packet to be transmitted to the destination node), so that the scheduling module determines a quantity of connected dynamic links according to the quantity of congested packets.

Step 406: The scheduling module controls, according to the congestion information, the selection circuit module to connect at least one dynamic link of the congested node to at least one dynamic link of a destination node by using at least one dynamic connection.

After obtaining the congestion information, the scheduling module may control, according to the congestion information, the selection circuit module to connect the at least one dynamic link of the node D1 to the at least one dynamic link of the node D2 by using the at least one dynamic connection, so as to form at least one dynamic path. There may be a positive correlation between the quantity of connected dynamic links and a quantity of congested packets in the node D1.

This embodiment of the present invention shows a scenario in which congestion occurs between two nodes scheduled by the switching apparatus. Because the switching apparatus is configured to schedule the n nodes, the scheduling module may receive congestion information sent by multiple nodes. When multiple pairs of congested nodes and destination nodes related to the congestion information sent by the multiple nodes are different nodes, dynamic links of each pair of a congested node and a destination node are connected. However, when the multiple pairs of congested nodes and destination nodes overlap, dynamic links may be connected according to a specific scheduling strategy. For example, the node D1 and a node D3 each send a packet to the node D2 and are congested. In this case, the node D1 and the node D3 send congestion information to the scheduling module. The scheduling module may allocate dynamic links of the node D2 according to a quantity of congested packets and a node waiting time that are in the congestion information, so that some dynamic links of the node D2 are connected to the node D1, and some other dynamic links are connected to the node D3.

Step 407: The scheduling module sends indication information of the at least one dynamic connection to the node D1 and the node D2.

After establishing a dynamic connection for connecting the node D to the node D2, the scheduling module may send the indication information of the at least one dynamic connection to the node D and the node D2, so as to instruct the node D1 and the node D2 to transmit a congested packet by using the at least one dynamic connection. That is, the scheduling module may notify the congested node and the destination node in advance that the congested packet may be transmitted by using the established dynamic connection.

Step 408: The switching apparatus transmits a congested packet to the node D2 by using the at least one dynamic link of the node D1, the at least one dynamic connection, and the at least one dynamic link of the node D2.

After the scheduling module sends the indication information of the dynamic connection to the node D1 and the node D2, the node D1 transmits a congested packet by using the at least one dynamic connection, until all congested packets are transmitted. A process of transmitting a congested packet is similar to a process of transmitting a packet by using a static link. Details are not described herein.

A bandwidth between the congested node and the destination node is increased by using a dynamic link. Therefore, the congested packets can be transmitted very soon.

Step 409: The scheduling module controls the selection circuit module to disconnect the at least one dynamic connection between the node DL and the node D2.

When the node D1 transmits all the congested packets to the node D2, that is, the congestion is cleared, the scheduling module may control the selection circuit module to disconnect the at least one dynamic connection between the node D1 and the node D2. In this way, a dynamic link can be released in time, so that the scheduling module can re-allocate a dynamic link connection relationship. By disconnecting a connection between dynamic links in time, dynamic link utilization can be improved, and a congestion processing capability of the switching apparatus is improved.

For example, m dynamic links of the node D1 are connected to m dynamic links of the node D2. After the node D1 transmits, to the node D2, all congested packets whose destination nodes are a node B, the scheduling module may control the selection circuit module to disconnect connections between the dynamic links of the node D1 and the dynamic links of the node D2. In this way, the node D1 has idle dynamic links, and when the node D1 is congested and a destination node of a congested packet is a node D3, the scheduling module may control the selection circuit module to connect the idle dynamic link of the node D1 to a dynamic link of the node D3, so that the DL can have more dynamic links for data transmission, and a data transmission rate is increased.

It should be noted that "first", "second", and "third" added before "SERDES module", "static link", and "dynamic link" in the embodiments of the present invention are used merely for distinguishing these concepts, and are not special names for these concepts.

In conclusion, according to the data transmission method provided in this embodiment of the present invention, multiple nodes are connected together by using the selection circuit module, so that routing is not required in data transmission, a related-technology problem that a data transmission delay is relatively large and work efficiency of a computer system is affected because data undergoes multiple times of conversion in a switching apparatus is resolved, and the data does not need to be converted into a packet that includes routing information. Therefore, a quantity of data conversion times in a transmission process is reduced, a data transmission delay is shortened, and the work efficiency of the computer system is improved.

The embodiments of the present invention further provide a switching apparatus group. The switching apparatus group includes at least two switching apparatuses connected to each other. At least one switching apparatus is the switching apparatus shown in FIG. 1, FIG. 2, or FIG. 3. That is, the switching apparatus group may include the switching apparatus shown in FIG. 1, FIG. 2, or FIG. 3, and may further include a switching apparatus in a related technology. For a connection manner between multiple switching apparatuses, refer to a switching chip group in a related technology. For example, when a switching apparatus is connected to another switching apparatus, the another switching apparatus may be considered as a node.

The embodiments of the present invention further provide a computer system. The computer system includes a switching apparatus and n nodes. The switching apparatus may be the switching apparatus shown in FIG. 1, FIG. 2, or FIG. 3, and is configured to schedule data in the n nodes.

In an optional implementation, the n nodes include at least one switching apparatus shown in FIG. 1, FIG. 2, or FIG. 3. That is, the computer system may include multiple switching apparatuses. The multiple switching apparatuses may form a switching apparatus group, so as to increase a quantity of nodes that can be scheduled by the computer system.

Figure 6:
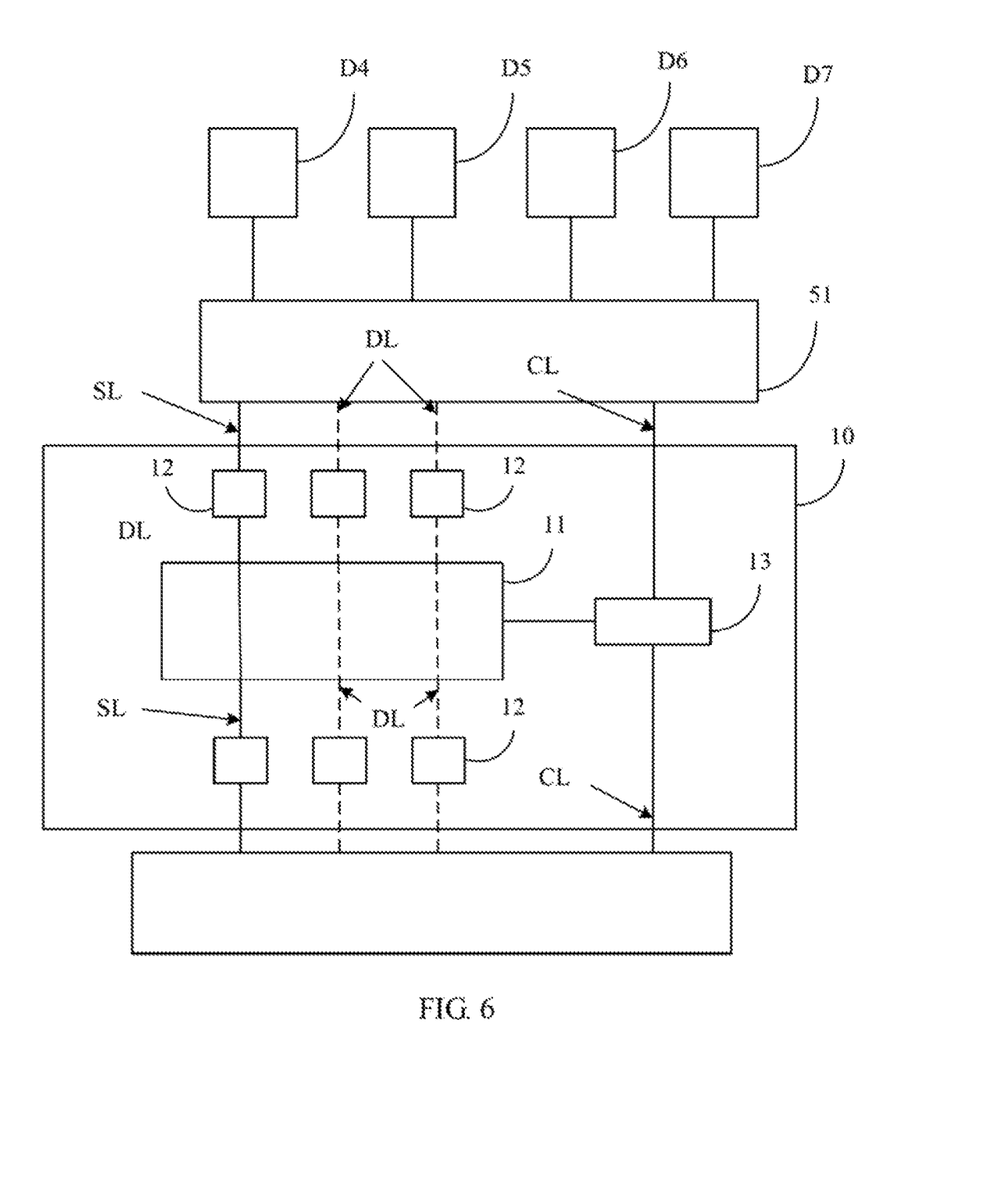
FIG. 6 is a schematic structural diagram of a computer system according to an embodiment of the present invention.

In an optional implementation, as shown in FIG. 6, the n nodes include at least one node controller 51. The node controller 51 is configured to establish a connection between the n nodes and other nodes (nodes D4, D5, D6, and D7 shown in FIG. 6). The other nodes are nodes other than the n nodes. Due to a hardware limitation, quantities of static links and dynamic links that can be connected to each node are limited to an extent. Therefore, the node may be connected to a node controller, so as to increase a quantity of nodes that can be scheduled by a switching apparatus. For connection between the node controller and the node, refer to a related technology. Details are not described herein. For meanings of other marks in FIG. 6, refer to FIG. 1.

In the several embodiments provided in this application, it should be understood that the disclosed apparatus and method may be implemented in other manners. For example, the described apparatus embodiment is merely an example. For example, the module division is merely logical function division and may be other division in actual implementation. For example, a plurality of modules or components may be combined or integrated into another system, or some features may be ignored or not performed. In addition, the displayed or discussed mutual couplings or direct couplings or communication connections may be implemented through some interfaces. The indirect couplings or communication connections between the apparatuses or modules may be implemented in electronic, mechanical, or other forms.

The modules described as separate parts may or may not be physically separate, and parts displayed as modules may or may not be physical modules, may be located in one position, or may be distributed on a plurality of network modules. Some or all of the modules may be selected according to actual needs to achieve the objectives of the solutions of the embodiments.

A person of ordinary skill in the art may understand that all or some of the steps of the embodiments may be implemented by hardware or a program instructing related hardware. The program may be stored in a computer-readable storage medium. The storage medium may include: a read-only memory, a magnetic disk, or an optical disc.

The foregoing descriptions are merely examples of embodiments of the present invention, but are not intended to limit the present invention. Any modification, equivalent replacement, and improvement made without departing from the spirit and principle of the present invention shall fall within the protection scope of the present invention.

What is claimed is:

1. A switching apparatus, configured to schedule data in n nodes, wherein n is an integer greater than 1, and the switching apparatus comprises:
   a selection circuit module to establish at least (n−1) static links with each of the n nodes, and any two static links that are connected to the selection circuit module and that belong to different nodes are connected to each other in the selection circuit module, and to establish at least one dynamic link with each of the n nodes;
   a serializer/deserializer (SERDES) module disposed on a static link connected to the selection circuit module, and configured to: convert serial physical code that needs to enter the selection circuit module by using the static link into parallel physical code, and convert parallel physical code that is sent from the selection circuit module and that enters the static link into serial physical code; and
   a scheduling module to establish a connection to the selection circuit module and each of the n nodes, and to control, according to congestion information sent by a congested node among the n nodes, the selection circuit module to connect at least one dynamic link of the congested node to at least one dynamic link of a destination node from among the n nodes, the congestion information comprising indication information of the destination node that a congested packet to be transmitted from the congested node needs to reach, wherein
   the congestion information further comprises a quantity of congested packets in the congested node.

2. The switching apparatus according to claim 1, wherein the switching apparatus further comprises a conversion module, disposed on the connection between the scheduling module and at least one of the n nodes, and configured to: convert parallel physical code that needs to enter the scheduling module into a packet, and convert a packet sent from the scheduling module into parallel physical code; and
   the conversion module comprises a physical layer unit and a link layer unit.

3. The switching apparatus according to claim 2, wherein the SERDES module is further disposed on a connection between the conversion module and the at least one of the n nodes, and is configured to: convert serial physical code that needs to enter the scheduling module into parallel physical code, and convert parallel physical code sent from the scheduling module into serial physical code.

4. A computer system, comprising:
   the switching apparatus is the switching apparatus according to claim 1, and the n nodes.

5. The computer system according to claim 4, wherein the n nodes comprise at least one node controller configured to establish a connection between the n nodes and nodes other than the n nodes.

6. The switching apparatus according to claim 1, wherein the SERDES module is further disposed on the dynamic link between the selection circuit module and the node, and is configured to: convert serial physical code that needs to enter the selection circuit module into parallel physical code, and convert parallel physical code sent from the selection circuit module into serial physical code.

7. The switching apparatus according to claim 1, wherein the scheduling module is further configured to: when congestion in the congested node is cleared, control the selection circuit module to disconnect a connection between the dynamic link of the congested node and the dynamic link of the destination node.

8. A switching apparatus group, wherein the switching apparatus group comprises at least two switching apparatuses that are connected to each other, and at least one of the switching apparatuses is the switching apparatus according to claim 1.

9. The switching apparatus according to claim 1, wherein a number of dynamic links of the congested node and a number of dynamic links of the destination node which are to be connected to one another by the selection circuit module increases as the quantity of congested packets in the congested node increases.

10. A data transmission method for a system including n nodes, the method comprising:
    converting, by using a serializer/deserializer (SERDES) module on a first static link, serial physical code to be transmitted to a selection circuit module into parallel physical code, wherein the first static link is a static link connected to the selection circuit module;
    after the parallel physical code enters the selection circuit module, transmitting the parallel physical code to a second static link connected to the first static link;
    after the parallel physical code is converted into serial physical code by using a SERDES module on the second static link, transmitting the serial physical code to a node among the n nodes which is connected to the second static link, wherein the second static link is a static link connected to the selection circuit module, and the first static link and the second static link are connected to different nodes among the n nodes;
    when a scheduling module receives congestion information including a quantity of congested packets in a congested node sent by the congested node among the n nodes, controlling, according to the congestion information, the selection circuit module to connect at least one dynamic link of the congested node to at least one dynamic link of a destination node among the n nodes by using at least one dynamic connection, wherein the congestion information comprises indication information of the destination node, and the destination node is a node that a congested packet to be transmitted from the congested node needs to reach; and
    transmitting the congested packet to the destination node by using the at least one dynamic link of the congested node, the at least one dynamic connection, and the at least one dynamic link of the destination node.

11. The method according to claim 10, wherein after the transmitting the congested packet to the destination node by using the at least one dynamic link of the congested node, the at least one dynamic connection, and the at least one dynamic link of the destination node, the method further comprises:
    disconnecting the at least one dynamic connection.

12. The method according to claim 10, wherein before the transmitting the congested packet to the destination node by using the at least one dynamic link of the congested node, the at least one dynamic connection, and the at least one dynamic link of the destination node, the method further comprises:
    sending indication information of the at least one dynamic connection to the congested node and the destination node by using the scheduling module, wherein the indication information of the at least one dynamic connection is used to instruct the congested node and the destination node to transmit the congested packet by using the at least one dynamic connection.

\* \* \* \* \*